US010830435B2

(12) United States Patent
Sobanski et al.

(10) Patent No.: US 10,830,435 B2
(45) Date of Patent: Nov. 10, 2020

(54) DIFFUSING HOLE FOR RAIL EFFUSION

(71) Applicant: UNITED TECHNOLOGIES CORPORATION, Farmington, CT (US)

(72) Inventors: Jon E Sobanski, Glastonbury, CT (US); Steven D Porter, Wethersfield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 153 days.

(21) Appl. No.: 15/889,816

(22) Filed: Feb. 6, 2018

(65) Prior Publication Data
US 2020/0200386 A1 Jun. 25, 2020

(51) Int. Cl.
*F23R 3/00* (2006.01)
*F02C 7/24* (2006.01)

(52) U.S. Cl.
CPC .............. *F23R 3/002* (2013.01); *F02C 7/24* (2013.01)

(58) Field of Classification Search
CPC .. F23R 3/002; F23R 3/60; F23R 2900/03041; F23R 2900/03042; F23R 2900/03043; F23R 2900/03044; F23R 2900/03045; F23R 3/06; F02C 7/24; F02K 1/82; F02K 1/822; F02K 1/827; F05D 2240/15; F23M 5/08; F23M 5/085; F23M 9/04; F23M 2900/05005
See application file for complete search history.

(56) References Cited

U.S. PATENT DOCUMENTS

| 4,158,949 | A | 6/1979 | Reider |
| 4,242,871 | A | 1/1981 | Breton |
| 5,079,915 | A | * | 1/1992 | Veau ................ F02K 1/822 |
| | | | | 60/753 |
| 5,419,681 | A | 5/1995 | Lee |
| 6,029,455 | A | 2/2000 | Sandelis |
| 6,810,673 | B2 | 11/2004 | Snyder |
| 7,812,282 | B2 | 10/2010 | Kuhn et al. |
| 8,291,709 | B2 | 10/2012 | Cayre et al. |

(Continued)

FOREIGN PATENT DOCUMENTS

| DE | 102007000516 | 5/2008 |
| EP | 1503144 | 2/2005 |

(Continued)

OTHER PUBLICATIONS

European Patent Office, European Search Report dated Mar. 6, 2019 in Application No. 19154252.1.

(Continued)

*Primary Examiner* — Jason H Duger
(74) *Attorney, Agent, or Firm* — Snell & Wilmer L.L.P.

(57) ABSTRACT

A heat shield panel for use in a gas turbine engine combustor is disclosed. The heat shield panel includes a hot side defining a first surface having an outer perimeter, a cold side defining a second surface spaced from the first surface, a rail member disposed on the cold side proximate a first portion of the outer perimeter, the rail member having an outer wall and an inner wall, and an orifice extending through the rail member, from the inner wall to the outer wall, the orifice having a cross sectional area that increases from the inner wall to the outer wall.

13 Claims, 7 Drawing Sheets

(56) References Cited

U.S. PATENT DOCUMENTS

| | | | |
|---|---|---|---|
| 9,518,739 | B2 | 12/2016 | Hu |
| 9,555,470 | B1 | 1/2017 | Heneveld et al. |
| 9,752,447 | B2 | 9/2017 | Clum et al. |
| 2001/0005555 | A1 | 6/2001 | Kreis |
| 2002/0124572 | A1 | 9/2002 | Pidcock |
| 2004/0146399 | A1 | 7/2004 | Balms |
| 2006/0059916 | A1 | 3/2006 | Cheung |
| 2007/0283700 | A1 | 12/2007 | Gerendas |
| 2008/0271457 | A1 | 11/2008 | McMasters |
| 2009/0077974 | A1 | 3/2009 | Dahlke |
| 2009/0199837 | A1 | 8/2009 | Tschirren |
| 2010/0095679 | A1 | 4/2010 | Rudrapatna |
| 2011/0197590 | A1 | 8/2011 | Bottcher |
| 2012/0272652 | A1 | 11/2012 | Nicholls |
| 2014/0096528 | A1 | 4/2014 | Cunha et al. |
| 2014/0238030 | A1 | 8/2014 | Gerendas |
| 2014/0290258 | A1 | 10/2014 | Gerendas et al. |
| 2015/0027127 | A1 | 1/2015 | Clemen |
| 2015/0292741 | A1 | 10/2015 | Cunha et al. |
| 2015/0354818 | A1 | 12/2015 | Lebel |
| 2015/0377033 | A1 | 12/2015 | Xu |
| 2016/0003056 | A1 | 1/2016 | Xu |
| 2016/0054001 | A1* | 2/2016 | Bangerter .............. F23R 3/005 60/772 |
| 2016/0097285 | A1 | 4/2016 | Harding |
| 2016/0097325 | A1 | 4/2016 | Harding et al. |
| 2016/0102860 | A1 | 4/2016 | Chandler |
| 2016/0177758 | A1 | 6/2016 | Clum et al. |
| 2016/0193667 | A1 | 7/2016 | Luketic |
| 2016/0208704 | A1 | 7/2016 | Bouldin |
| 2016/0230996 | A1 | 8/2016 | Kostka |
| 2016/0238253 | A1 | 8/2016 | Moura |
| 2016/0245094 | A1 | 8/2016 | Bunker |
| 2016/0252249 | A1 | 9/2016 | Erbas-Sen |
| 2016/0258626 | A1 | 9/2016 | Moura |
| 2016/0265775 | A1 | 9/2016 | Cunha |
| 2016/0273363 | A1 | 9/2016 | Bunker |
| 2016/0273772 | A1* | 9/2016 | Cunha .................. F23R 3/06 |
| 2016/0305325 | A1 | 10/2016 | Cunha |
| 2016/0377289 | A1 | 12/2016 | Kostka, Jr. |
| 2017/0009987 | A1 | 1/2017 | McKinney |
| 2017/0114798 | A1 | 4/2017 | Spangler |
| 2017/0205069 | A1 | 7/2017 | Tentorio |
| 2017/0227220 | A1 | 8/2017 | Schilp et al. |
| 2017/0241643 | A1 | 8/2017 | Mulcaire |
| 2017/0276356 | A1 | 9/2017 | Mulcaire |
| 2017/0298743 | A1* | 10/2017 | Webster ................ F01D 5/186 |
| 2017/0356653 | A1 | 12/2017 | Bagchi |
| 2018/0073736 | A1 | 3/2018 | Papple |
| 2018/0238545 | A1 | 8/2018 | Quach |
| 2018/0238547 | A1 | 8/2018 | Quach |
| 2018/0335212 | A1 | 11/2018 | Quach |
| 2019/0242580 | A1 | 8/2019 | Porter |
| 2019/0257206 | A1 | 8/2019 | Weebster |
| 2019/0285276 | A1 | 9/2019 | Porter |
| 2020/0033003 | A1 | 1/2020 | Gerendas |
| 2020/0041126 | A1 | 2/2020 | Anderson |

FOREIGN PATENT DOCUMENTS

| | | |
|---|---|---|
| EP | 2012531 | 4/2016 |
| EP | 3088100 | 11/2016 |
| EP | 3112755 | 1/2017 |
| EP | 3183497 | 6/2017 |
| GB | 2317005 | 3/1998 |
| WO | 2008017551 | 2/2008 |
| WO | 2014169127 | 10/2014 |
| WO | 2015108584 | 7/2015 |
| WO | 2015112220 | 7/2015 |
| WO | 2015112221 | 7/2015 |

OTHER PUBLICATIONS

European Patent Office, European Search Report dated Mar. 21, 2019 in Application No. 19155472.4.
European Patent Office, European Search Report dated Apr. 3, 2019 in Application No. 19156740.3.
European Patent Office, European Search Report dated Sep. 16, 2019 in Application No. 19154249.7.
USPTO, Sobanski et al, U.S. Appl. No. 15/902,171, filed Feb. 22, 2018 and entitled Multi-Direction Hole for Rail Effusion.
Porter et al, U.S. Appl. No. 15/889,764, filed Feb. 6, 2018 and entitled Pull-Plane Effusion Combustor Panel.
Porter et al, U.S. Appl. No. 15/889,793, filed Feb. 6, 2018 and entitled Undercut Combustor Panel Rail.
USPTO, Restriction/Election Requirement dated Oct. 24, 2019 in U.S. Appl. No. 15/889,793.
USPTO, Restriction/Election Requirement dated Dec. 12, 2019 in U.S. Appl. No. 15/889,764.
USPTO, Non-Final Office Action dated Jan. 21, 2020 in U.S. Appl. No. 15/889,793.
USPTO, Restriction/Election Requirement dated Nov. 1, 2019 in U.S. Appl. No. 15/902,171.
USPTO, Restriction/Election Requirement dated Jan. 16, 2020 in U.S. Appl. No. 15/902,171.
European Patent Office, European Search Report dated Jun. 13, 2019 in Application No. 19154249.7.
USPTO, Pre-Interview First Office Action dated Apr. 14, 2020 in U.S. Appl. No. 15/889,764.
USPTO, Pre-Interview First Office Action dated May 4, 2020 in U.S. Appl. No. 15/902,171.
European Patent Office, European Office Action dated Jun. 19, 2020 in Application No. 19154249.7.
USPTO, Final Office Action dated Jun. 25, 2020 in U.S. Appl. No. 15/889,793.
USPTO, First Action Interview Office Action dated Jul. 1, 2020 in U.S. Appl. No. 15/902,171.

* cited by examiner

DIFFUSING HOLE FOR RAIL EFFUSION

FIELD

The present disclosure relates to gas turbine engines and, more particularly, to effusion panels used in the combustors of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more panels and one or more shells. Cooling cavities reside between the panels and the shells. The cooling cavities fluidly couple impingement apertures defined in the shells with effusion apertures defined in the panels.

SUMMARY

A heat shield panel for use in a gas turbine engine combustor is disclosed. In various embodiments, the heat shield panel includes a hot side defining a first surface having an outer perimeter, a cold side defining a second surface spaced from the first surface, a rail member disposed on the cold side proximate a first portion of the outer perimeter, the rail member having an outer wall and an inner wall, and an orifice extending through the rail member, from the inner wall to the outer wall, the orifice having a cross sectional area that increases from the inner wall to the outer wall.

In various embodiments, the orifice includes an inner opening positioned on the inner wall, the inner opening having a portion in contact with the second surface. The orifice includes an outer opening positioned on the outer wall, the outer opening positioned to direct a flow of air through the orifice toward an engine component positioned adjacent the rail member. The engine component may be a second panel positioned adjacent the rail member. In various embodiments, the orifice includes an inner opening positioned on the inner wall that includes a circular cross section and an outer opening positioned on the outer wall that includes an oval cross section. In various embodiments, the outer perimeter has a rectangular shape and the first surface and the second surface have an arcuate shape. In various embodiments, the rail member extends entirely about the rectangular shape of the outer perimeter.

In various embodiments, the outer perimeter includes a first side and a second side spaced in a circumferential direction from the first side, the first side including a first rail and the second side including a second rail, the first rail having a first orifice extending there through, the first orifice having a first cross sectional area that increases from a first inner wall to a first outer wall and the second rail having a second orifice extending there through, the second orifice having a second cross sectional area that increases from a second inner wall to a second outer wall.

In various embodiments, the outer perimeter includes a first side and a second side spaced in an axial direction from the first side, the first side including a first rail and the second side including a second rail, the first rail having a first orifice extending there through, the first orifice having a first cross sectional area that increases from a first inner wall to a first outer wall and the second rail having a second orifice extending there through, the second orifice having a second cross sectional area that increases from a second inner wall to a second outer wall.

In various embodiments, the outer perimeter includes a third side and a fourth side spaced in a circumferential direction from the third side, the third side including a third rail and the fourth side including a fourth rail, the third rail having a third orifice extending there through, the third orifice having a third cross sectional area that increases from a third inner wall to a third outer wall and the fourth rail having a fourth orifice extending there through, the fourth orifice having a fourth cross sectional area that increases from a fourth inner wall to a fourth outer wall. In various embodiments, the first rail includes a first plurality of orifices extending there through, the second rail includes a second plurality of orifices extending there through, the third rail includes a third plurality of orifices extending there through, and the fourth rail includes a fourth plurality of orifices extending there through.

A heat shield panel for use in a gas turbine engine combustor is disclosed. In various embodiments, the heat shield panel includes a hot side defining a first surface having an outer perimeter, a cold side defining a second surface spaced from the first surface, a rail member disposed on the cold side proximate a first portion of the outer perimeter, the rail member having an outer wall and an inner wall, and a diffusing hole extending through the rail member, from the inner wall to the outer wall.

In various embodiments, the diffusing hole includes an inner opening positioned on the inner wall. In various embodiments, the diffusing hole includes an outer opening positioned on the outer wall, the outer opening positioned to direct a flow of air through the diffusing hole toward an engine component positioned adjacent the rail member. In various embodiments, the diffusing hole includes an inner opening positioned on the inner wall that includes a circular cross section and an outer opening positioned on the outer wall that includes an oval cross section. In various embodiments, the diffusing hole includes a cross sectional area that increases in size continuously from the inner opening to the outer opening.

A method of forming an orifice through a rail member of a heat shield panel having a cold side surface is disclosed. In various embodiments, the method includes the steps of positioning the rail member at a first position relative to a hole boring tool, where the hole boring tool is at a first predetermined angle relative to the cold side surface, forming a first cut into the rail member using the hole boring tool, the first cut extending partially through the rail member, positioning the rail member at a second position relative to the hole boring tool, where the hole boring tool is at a second predetermined angle relative to the cold side surface, forming a second cut into the rail member using the hole boring tool, the second cut extending completely through the rail member and intersecting a portion of the first cut to form the orifice, extending through the rail member, from an inner wall of the rail member to an outer wall of the rail member, the orifice having a cross sectional area that increases from the inner wall to the outer wall.

In various embodiments, the hole boring tool is one of a conventional drill, an electrical discharge machining electrode, a water jet and a laser drill. In various embodiments, the steps of forming the first cut and forming the second cut are performed continuously. In various embodiments, the method includes the step of discontinuing forming the first cut prior to positioning the rail member at the second position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
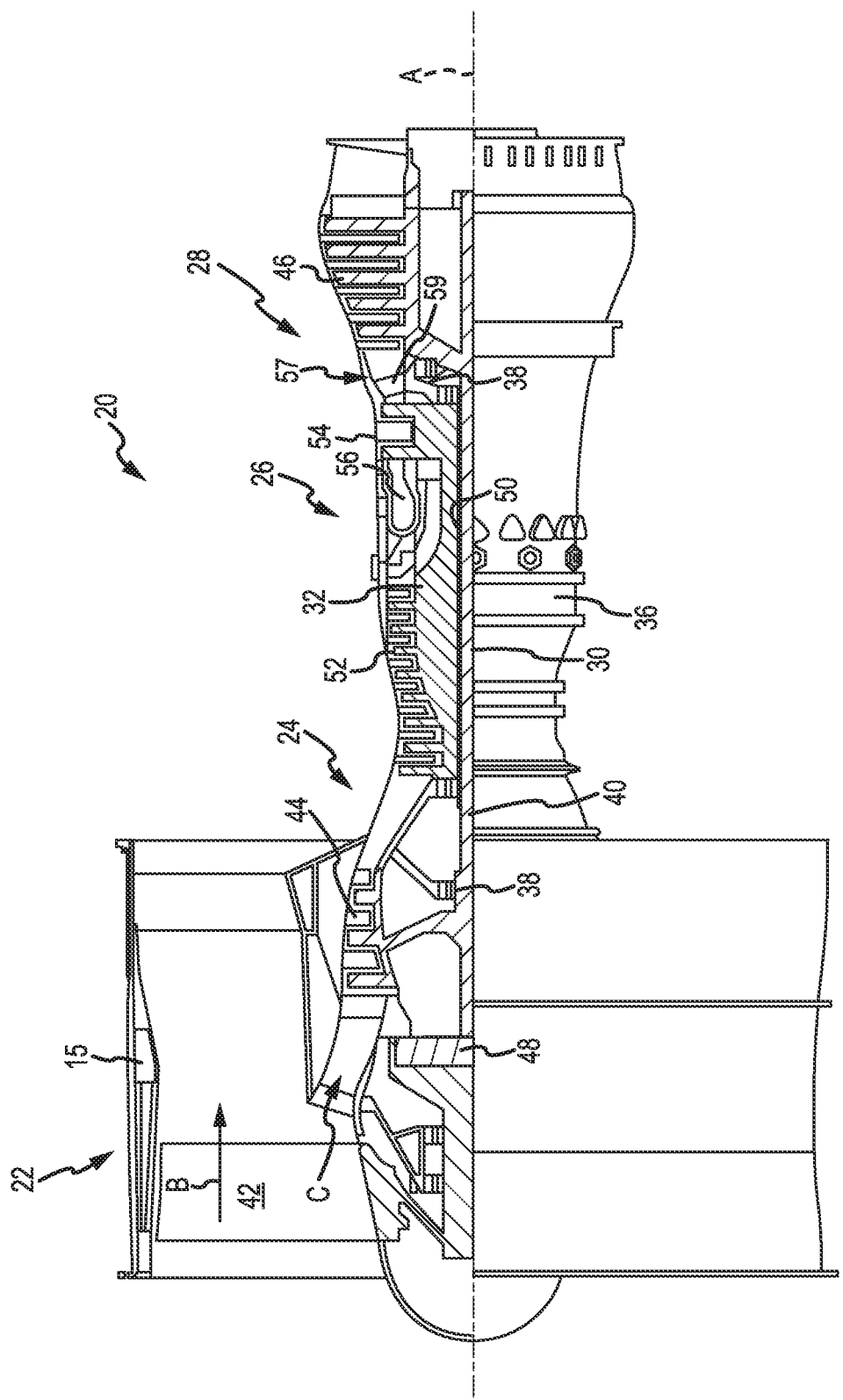
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
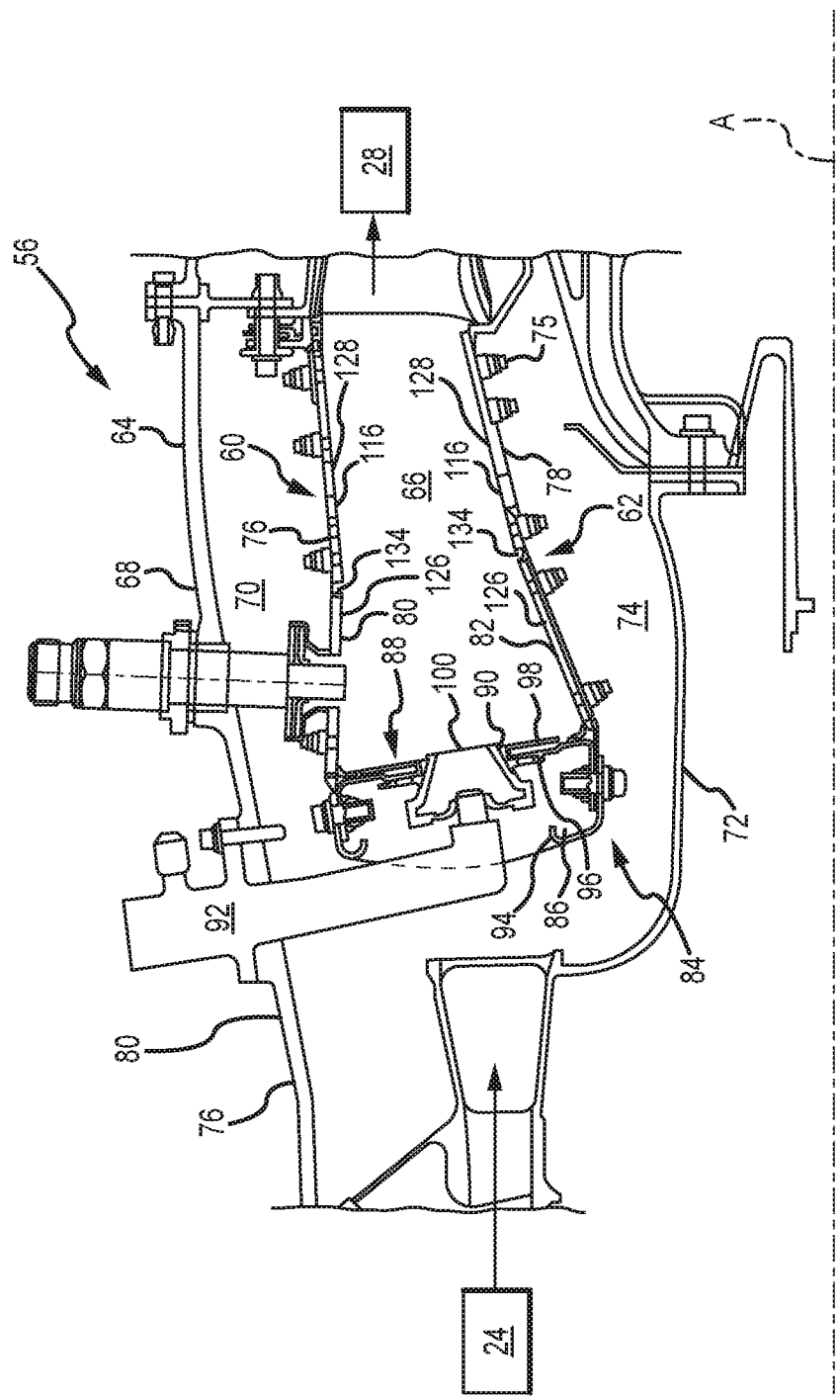
FIG. 1B is a cross sectional schematic view of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure. It should be further understood that the disclosed cooling flow paths are but an illustrated embodiment.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, a bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces core compressed air into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum is also introduced into the combustion chamber 66 via a plurality of orifices 116, which may include dilution holes or air feed holes of various dimension. The outer support shell 76 may also include a plurality of impingement holes (discussed further below) that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 1C:
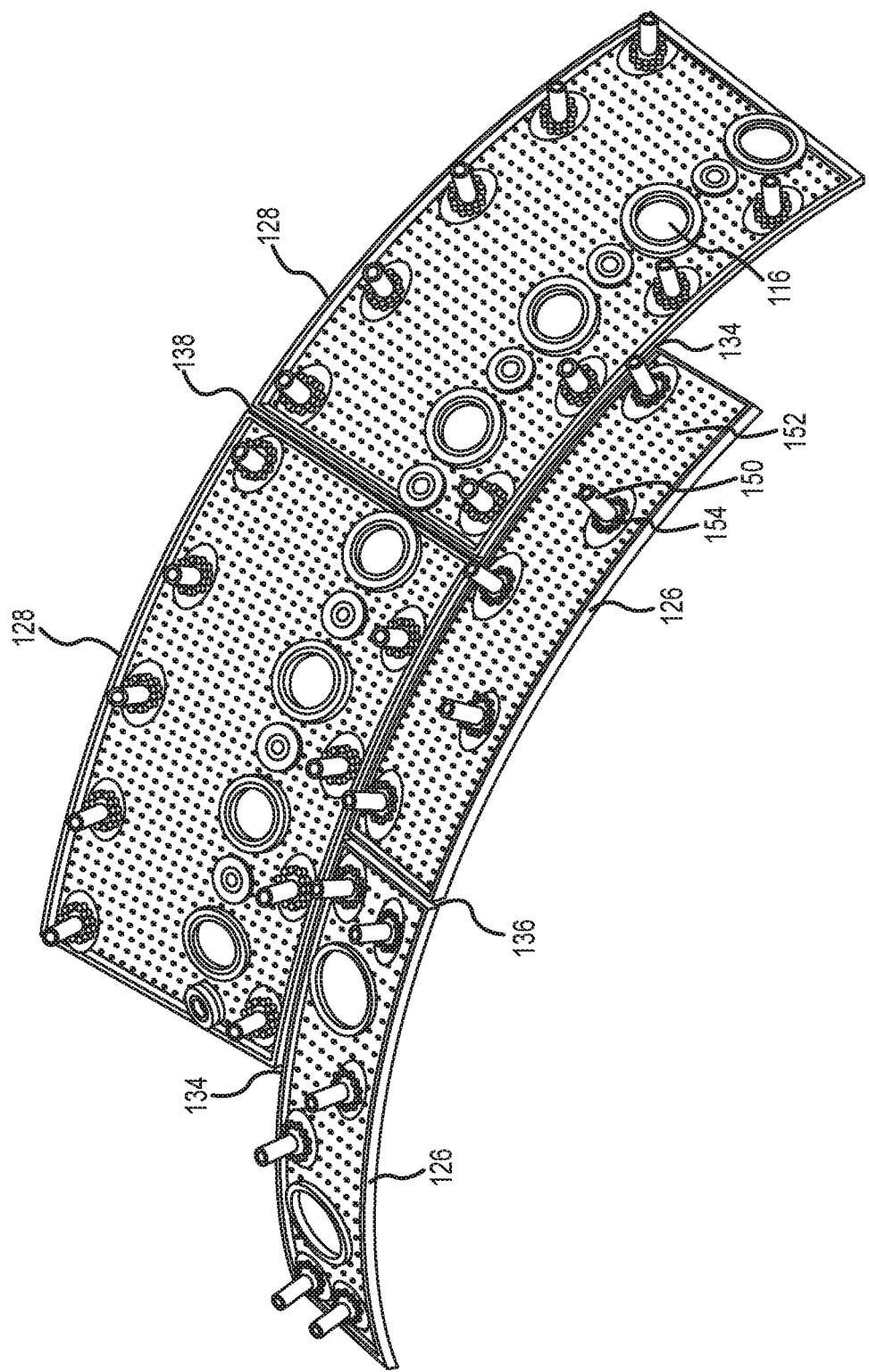
FIG. 1C is a perspective schematic view of a heat shield panel arrangement of a combustor, viewing from a cold side, according to various embodiments.

Turning now to FIG. 1C (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1C is the plurality of orifices 116, that may include dilution holes or air feed holes of various dimension, a plurality of effusion holes 152 and a shield attachment mechanism, which includes a stud 150 and a plurality of spacer pins 154.

Figure 2:
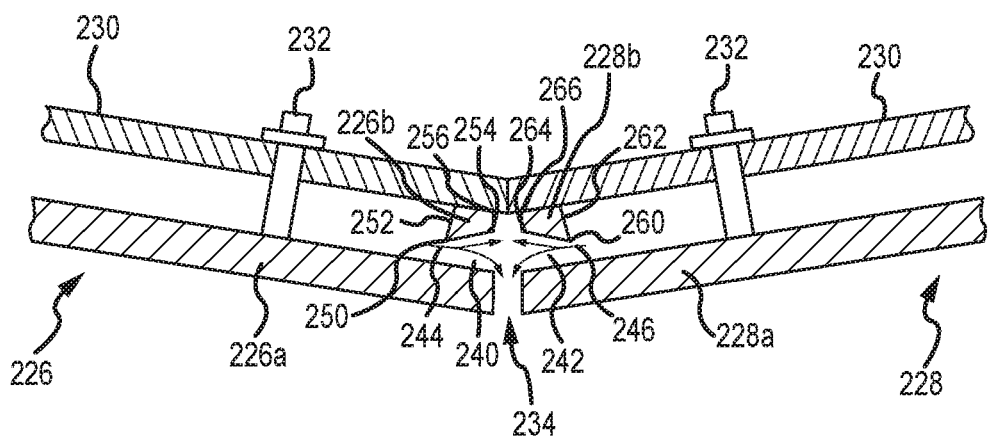
FIG. 2 is a side schematic view of two heat shield liner assemblies positioned adjacent one another and forming a gap between respective panel components of the heat shield liner assemblies, according to various embodiments.

Referring now to FIG. 2, a side view of a circumferentially extending gap 234 formed between a first liner 226 and a second liner 228 positioned adjacent the first liner 226 is shown. The first liner 226 includes a first panel 226a and a first panel rail member 226b extending from the first panel 226a. As installed, the first panel 226a defines a wall of a combustion chamber and the first panel rail member 226b extends outwardly and away from the combustion chamber toward a shell 230 to which the first panel 226a is mounted.

An attachment mechanism 232 is configured to mount the first panel 226a to the shell 230. Similarly, the second liner 228 includes a second panel 228a and a second panel rail member 228b extending from the second panel 228a. The second panel 228a defines a wall of a combustion chamber and the second panel rail member 228b extends outwardly and away from the combustion chamber toward the shell 230 to which the second panel 228a is mounted. An attachment mechanism 232 is configured to mount the second panel 228a to the shell 230. The circumferentially extending gap 234 is formed between the first panel 226a and the second panel 228a and the respective orientations of the first panel rail member 226b and the second panel rail member 228b determine the size of the gap 234. It may be desirable, for example, for cooling purposes, to not have the first panel 226a and the second panel 228a in contact with each other.

As illustrated, the first panel rail member 226b and the second panel rail member 228b can be configured substantially perpendicular to the respective first panel 226a and second panel 228a. Impingement cooling within the circumferentially extending gap 234 can be used. The impingement cooling can help relieve heating or oxidation of the first panel 226a and the second panel 228a, or the respective first panel rail member 226b and second panel rail member 228b, in the vicinity of the circumferentially extending gap 234 due to hot combustion gases flowing from the combustion chamber, entraining into the circumferentially extending gap 234, and resulting in burn back oxidation distress.

In various embodiments, as described more fully below, the impingement cooling may result from a first impingement orifice 240 extending through the first panel rail member 226b and directed toward the second panel rail member 228b and from a second impingement orifice 242 extending through the second panel rail member 228b and directed toward the first panel rail member 226b. The configuration establishes a first impingement cooling flow 244 directed from the first panel rail member 226b toward the second panel rail member 228b and a second impingement cooling flow 246 directed from the second panel rail member 228b toward the first panel rail member 226b.

As described in further detail below, the first impingement orifice 240 includes a shape in the form of a diffuser or a diffusing nozzle. For example, the first impingement orifice 240 includes a first opening 250 positioned on a first inner wall 252 of the first panel rail member 226b. The first impingement orifice 240 extends through the first panel rail member 226b toward a second opening 254 positioned on a first outer wall 256 of the first panel rail member 226b. The first opening 250 has a cross sectional area that is smaller in size than a cross sectional area of the second opening 254. A cross sectional area of the first impingement orifice 240 increases in size from the first opening 250 toward the second opening 254, providing the first impingement orifice 240 with the shape of a diffuser or diffusing nozzle. Similarly, the second impingement orifice 242 includes a shape in the form of a diffuser or a diffusing nozzle. For example, the second impingement orifice 242 includes a first opening 260 positioned on a first inner wall 262 of the second panel rail member 228b. The second impingement orifice 242 extends through the second panel rail member 228b toward a second opening 264 positioned on a second outer wall 266 of the second panel rail member 228b. The first opening 260 has a cross sectional area that is smaller in size than a cross sectional area of the second opening 264. A cross sectional area of the second impingement orifice 242 increases in size from the first opening 260 toward the second opening 264, providing the second impingement orifice 242 with the shape of a diffuser or diffusing nozzle.

The diffusing shape of the first impingement orifice 240 may cause the first impingement cooling flow 244 to increase in pressure as it traverses the first impingement orifice 240 and to spread out upon exiting the second opening 254 positioned on the first outer wall 256 of the first panel rail member 226b and thereby cool a greater volume of the circumferentially extending gap 234 and a greater area of the second panel 228a and the second panel rail member 228b positioned adjacent thereto. Likewise, the diffusing shape of the second impingement orifice 242 may cause the second impingement cooling flow 246 to increase in pressure as it traverses the second impingement orifice 242 and to spread out upon exiting the second opening 264 positioned on the second outer wall 266 of the second panel rail member 228b and thereby cool a greater volume of the circumferentially extending gap 234 and a greater area of the first panel 226a and the first panel rail member 226b positioned adjacent thereto.

Figure 3:
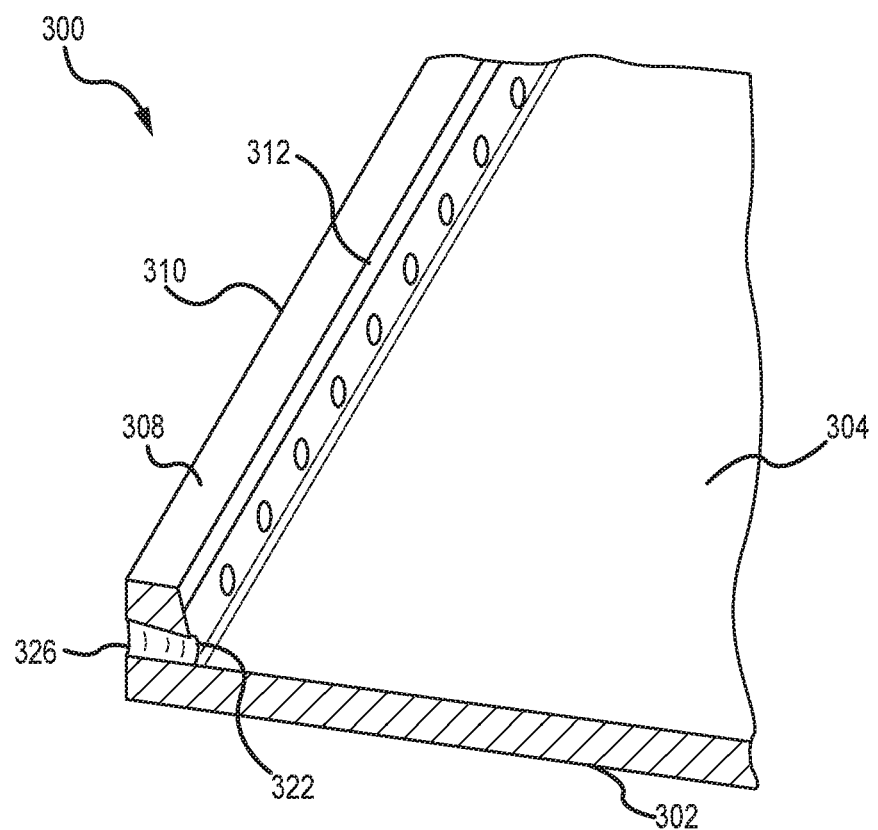
FIG. 3 is a perspective schematic view of a heat shield panel arrangement of a combustor, viewing from the cold side, according to various embodiments.

Referring now to FIG. 3, a schematic view of a heat shield panel 300 is provided, according to various embodiments. The heat shield panel 300 includes a hot side surface 302 and a cold side surface 304. The heat shield panel 300 includes an outer perimeter (e.g., rectangular, as illustrated in FIG. 1C) and a rail member 308 disposed on the cold side surface 304 proximate at least a first portion of the outer perimeter. In various embodiments, the rail member 308 extends about the entire outer perimeter (e.g., the four-sided rail member as illustrated in FIG. 1C). The rail member 308 generally includes an outer wall 310 and an inner wall 312. A plurality of impingement orifices 320 extend through the rail member 308 from the outer wall 310 to the inner wall 312. As described above with reference to FIG. 2, the impingement orifices 320 provide a mechanism to cool hot combustion gases residing in gaps (both circumferential gaps and axial gaps) existing between adjacent liners or the panel components of the liners, and thereby also cooling the liners and the panel components thereof.

In various embodiments, each of the impingement orifices 320 includes a first opening 322 positioned on the inner wall 312 and a second opening 326 on the outer wall 310. The first opening 322 has a cross sectional area that is smaller in size than a cross sectional area of the second opening 326. A cross sectional area of each of the impingement orifices 320 increases in size from the first opening 322 toward the second opening 326, providing each of the impingement orifices 320 with the shape of a diffuser or diffusing nozzle. The diffuser or diffusing nozzle shape of the impingement orifices 320 need not occur across the entire length of the impingement orifices 320. For example, in various embodiments, an initial portion of the length (e.g., about 50% of the length between the first opening 322 and the second opening 326) of one or more of the impingement orifices 320 could be characterized by a constant cross sectional area followed by a divergent portion leading to the second opening 326. In various embodiments, the first opening 322 of each of the impingement orifices 320 may include a portion in contact with or tangent to the cold side surface 304, such that cooling fluid may flow smoothly across the cold side surface 304 and into the impingement orifices 320 with minimal obstruction. In various embodiments, the first opening 322 has a circular cross sectional shape and the second opening 326 has an oval cross sectional shape. While circular and oval cross sectional shapes are illustrated in the drawings, the disclosure contemplates any cross sectional shape be employed, so long as the impingement orifices 320 include a diffusing characteristic as described above.

Figure 3A:
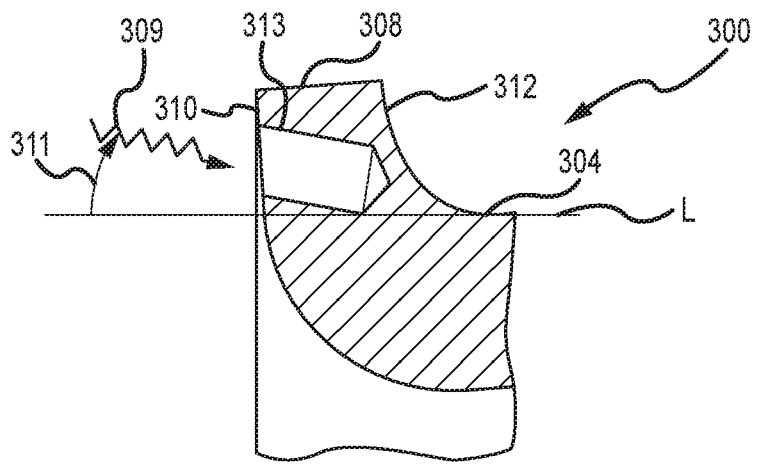
FIGS. 3A, 3B and 3C are schematic views illustrating steps used to form the orifices illustrated in FIG. 3, according to various embodiments.
Figure 3B:
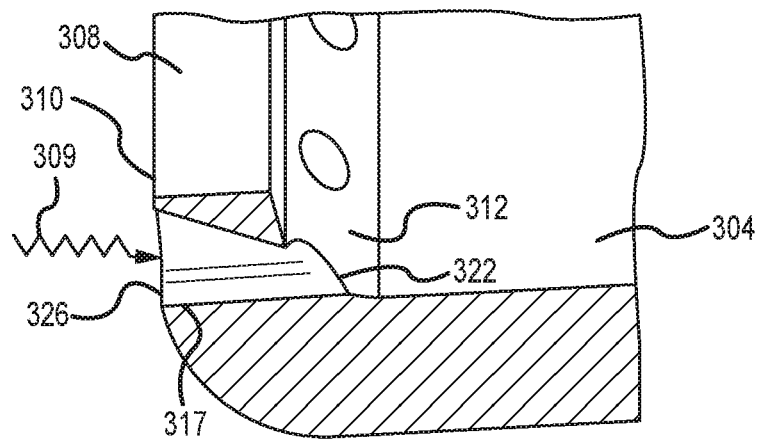
Figure 3C:
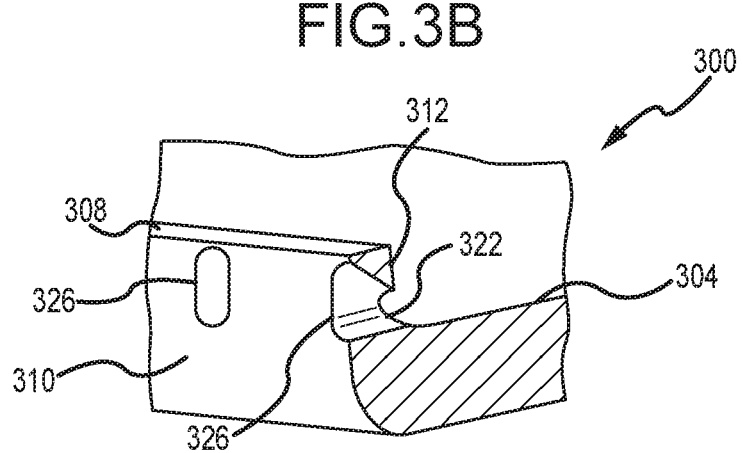

Referring now to FIGS. 3A, 3B and 3C, a method of forming one of the impingement orifices 320 described above is provided. Referring to FIG. 3A, for example, a portion of the rail member 308 is shown positioned relative to a hole boring tool 309, such as a conventional drill, an electrical discharge machining electrode, a waterjet or a laser drill. The hole boring tool 309 is positioned at a first predetermined angle 311 with respect to the rail member 308. In various embodiments, the first predetermined angle 311 may be measured with reference to a line L oriented tangent to a portion of the cold side surface 304 of the heat shield panel 300. A first cut 313 is then formed in the rail member 308 using the hole boring tool 309. In various embodiments, the first cut 313 extends partially through the rail member 308, starting from the outer wall 310 and toward the inner wall, but not penetrating through the inner wall 312. Referring now to FIG. 3B, the hole boring tool 309 is extracted (for a hole boring tool 309 that enters the first cut 313) and/or turned off (for any hole boring tool 309) and then repositioned to a second predetermined angle (illustrated as being approximately zero degrees with respect to the line L in FIG. 3B) with respect to the rail member 308. In various embodiments, the second predetermined angle may be set such that the hole boring tool 309 is set parallel with or tangent to the cold side surface 304 of the heat shield panel 300, though the disclosure contemplates any orientation that results in the impingement orifices 320 having the diffusing shape described above. A second cut 317 is then formed in the rail member 308 using the hole boring tool 309. In various embodiments, the second cut 317 extends completely through the rail member 308, starting from the outer wall 310 and finishing when the hole boring tool 309 has penetrated the inner wall 312, without extending into or through the cold side surface 304 of the heat shield panel 300 or without forming a longitudinal trough through a part of the cold side surface 304. The second cut 317 is oriented to intersect a portion of the first cut 313, such that a first opening 322 through the inner wall 312 and a second opening 326 through the outer wall 310 result, with the first opening 322 having a cross sectional area that is smaller than a cross sectional area of the second opening 326, as illustrated in FIG. 3C. In various embodiments, the hole boring tool 309 may be configured to bore a substantially circular hole, such that the second cut 317 penetrating through the inner wall 312 results in a first opening 322 that is substantially circular in cross section and the intersection of the first cut 313 and the second cut 317 results in a second opening that is substantially oval in cross section.

Alternatively, the hole boring tool 309 can be operated continuously in forming both the first cut 313 and the second cut 317. For example, the hole boring tool 309 is positioned at a first predetermined angle 311 with respect to the rail member 308 to make the first cut 313. The hole boring tool 309 is then continuously rotated to the second predetermined angle with respect to the rail member 308 to make the second cut 317, the result being continuous removal of material as the hole boring tool 309 rotates or translates between a first position corresponding to the first predetermined angle 311 and a second position corresponding to the second predetermined angle.

Figure 4:
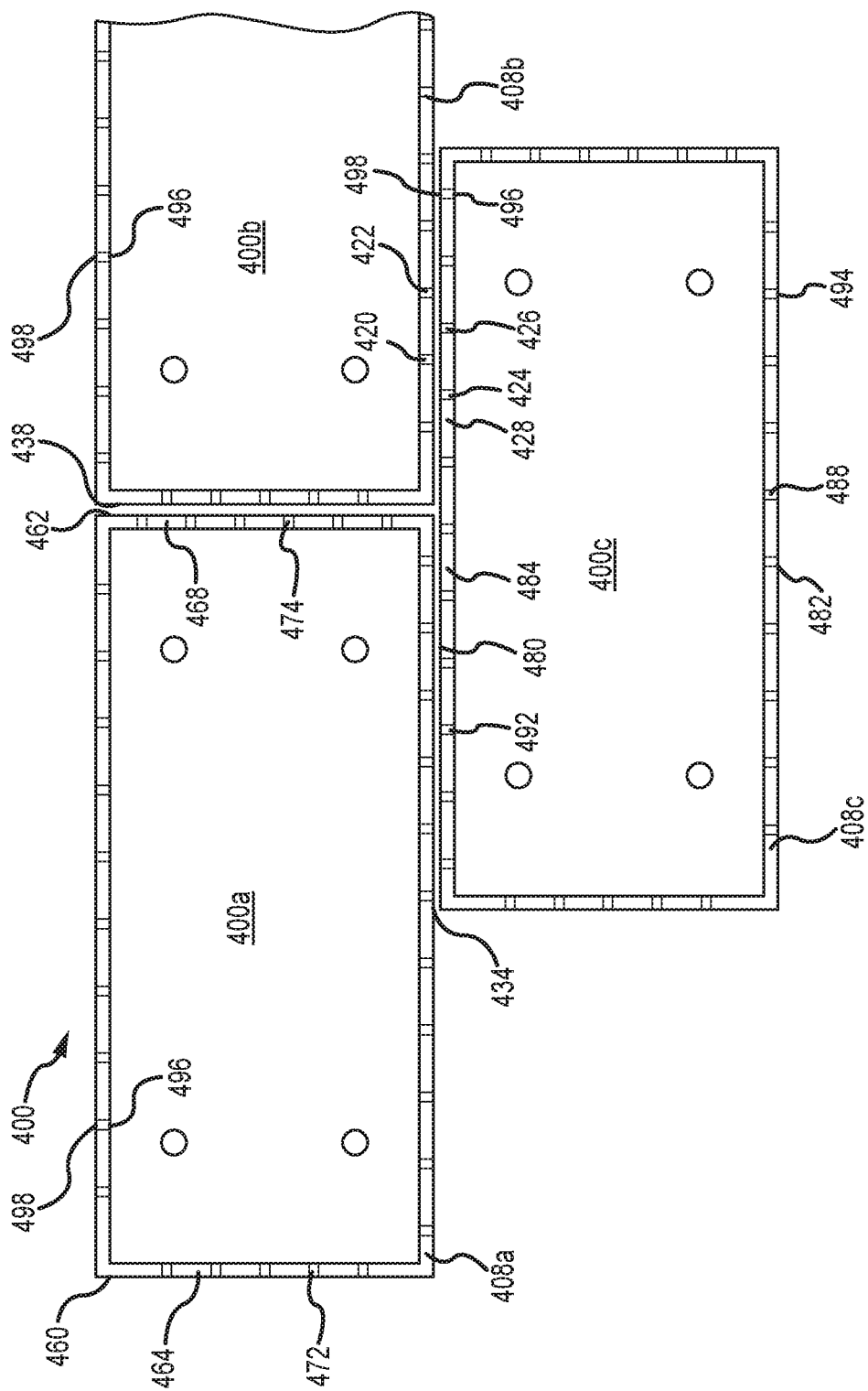
FIG. 4 is an overhead schematic view of a heat shield panel arrangement, viewing from the cold side, according to various embodiments.

Referring now to FIG. 4, a heat shield arrangement 400 is illustrated, having a first heat shield panel 400a positioned circumferentially adjacent to a second heat shield panel 400b, while a third heat shield panel 400c is positioned axially adjacent to both the first heat shield panel 400a and the second heat shield panel 400b. Similar to the above description with reference to FIG. 3, the first heat shield panel 400a may include a first rail member 408a, which may extend about an outer perimeter of the first heat shield panel 400a. Likewise, the second heat shield panel 400b may include a second rail member 408b and the third heat shield panel 400c may include a third rail member 408c. An axially extending gap 438 is formed between the first heat shield panel 400a and the second heat shield panel 400b. A circumferentially extending gap 434 is formed between both the first heat shield panel 400a and the second heat shield panel 400b and the third heat shield panel 400c, which is positioned axially adjacent the former pair of heat shield panels.

Referring to the first heat shield panel 400a, the outer perimeter may include a first side 460 and a second side 462 spaced in a circumferential direction from the first side 460. The first side 460 may include a first rail member 464 while the second side 462 may include a second rail member 468. The first rail member 464 includes one or more first impingement orifices 472 extending there through, while the second rail member 468 includes one or more second impingement orifices 474 extending there through. In similar fashion, referring to the third heat shield panel 400c, the outer perimeter may include a first side 480 and a second side 482 spaced in an axial direction from the first side 480. The first side 480 may include a first rail member 484 while the second side 482 may include a second rail member 488. The first rail member 484 includes one or more first impingement orifices 492 extending there through, while the second rail member 488 includes one or more second impingement orifices 494 extending there through. Each of the first impingement orifices 492 and the second impingement orifices 494 includes a first opening 496 on an inner wall and a second opening 498 on an outer wall of the respective rail members. Each first opening 496 has a cross sectional area that is smaller than a cross sectional area of each second opening 498 corresponding to each first opening, consistent with the diffusor shape characteristics in the description provided above. In various embodiments, all the impingement orifices throughout the various heat shield panels include a similar first opening 496 and second opening 498, consistent with the diffuser characteristics described above. As illustrated in FIG. 4, each of the heat shield panels may have third and fourth sides, including third and fourth rail members and third and fourth pluralities of impingement orifices extending through the third and fourth rail members, respectively. The third and fourth pluralities of impingement orifices also include shape characteristics that are consistent with the diffusor shape characteristics in the description provided above.

As further illustrated in FIG. 4, the pluralities of impingement orifices positioned on adjacent facing sides may be staggered to ensure the outflow from one orifice is not directed toward the outflow of an adjacent orifice. For example, the second heat shield panel 400b includes a first orifice 420 and a second orifice 422 extending through the second rail member 408b. The third heat shield panel 400c includes a first orifice 424 and a second orifice 426 extending through a rail member 428 positioned axially adjacent the second rail member 408b. Each pair of impingement orifices may be staggered from the other, as illustrated. In various embodiments, however, the pairs of impingement orifices may line up directly with each other. The disclosure contemplates embodiments where either situation or both situations may be present, not only among pairs of adjacently facing impingement orifices, but among entire pluralities of adjacently facing impingement orifices.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel for use in a gas turbine engine combustor, comprising:
    a hot side defining a first surface having an outer perimeter;
    a cold side defining a second surface spaced from the first surface;
    a rail member disposed on the cold side proximate a first portion of the outer perimeter, the rail member having an outer wall and an inner wall; and
    an orifice extending through the rail member, from the inner wall to the outer wall, the orifice having a cross sectional area that increases from the inner wall to the outer wall,
        wherein the orifice includes an inner opening positioned on the inner wall, the inner opening having a portion in contact with and tangent to the second surface.

2. The heat shield panel of claim 1, wherein the orifice includes an outer opening positioned on the outer wall, the outer opening positioned to direct a flow of air through the orifice toward an engine component positioned adjacent the rail member.

3. The heat shield panel of claim 2, wherein the engine component is a second panel positioned adjacent the rail member.

4. The heat shield panel of claim 1, wherein the inner opening positioned on the inner wall includes a circular cross section and the orifice includes an outer opening positioned on the outer wall that includes an oval cross section.

5. The heat shield panel of claim 1, wherein the outer perimeter has a rectangular shape and the first surface and the second surface have an arcuate shape.

6. The heat shield panel of claim 5, wherein the rail member extends entirely about the rectangular shape of the outer perimeter.

7. The heat shield panel of claim 5, wherein the outer perimeter includes a first side and a second side spaced in a circumferential direction from the first side, the first side including the rail member and the second side including a second rail member, the second rail member having a second orifice extending therethrough, the second orifice having a second cross sectional area that increases from a second inner wall to a second outer wall.

8. The heat shield panel of claim 5, wherein the outer perimeter includes a first side and a second side spaced in an axial direction from the first side, the first side including the rail member and the second side including a second rail member, the second rail member having a second orifice extending therethrough, the second orifice having a second cross sectional area that increases from a second inner wall to a second outer wall.

9. The heat shield panel of claim 8, wherein the outer perimeter includes a third side and a fourth side spaced in a circumferential direction from the third side, the third side including a third rail member and the fourth side including a fourth rail member, the third rail member having a third orifice extending therethrough, the third orifice having a third cross sectional area that increases from a third inner wall to a third outer wall and the fourth rail member having a fourth orifice extending therethrough, the fourth orifice having a fourth cross sectional area that increases from a fourth inner wall to a fourth outer wall.

10. A heat shield panel for use in a gas turbine engine combustor, comprising:
- a hot side defining a first surface having an outer perimeter;
- a cold side defining a second surface spaced from the first surface;
- a rail member disposed on the cold side proximate a first portion of the outer perimeter, the rail member having an outer wall and an inner wall; and
- a diffusing hole extending through the rail member, from the inner wall to the outer wall,
  - wherein the diffusing hole includes an inner opening positioned on the inner wall, the inner opening having a portion in contact with and tangent to the second surface.

11. The heat shield panel of claim 10, wherein the diffusing hole includes an outer opening positioned on the outer wall, the outer opening positioned to direct a flow of air through the diffusing hole toward an engine component positioned adjacent the rail member.

12. The heat shield panel of claim 10, wherein the inner opening positioned on the inner wall includes a circular cross section and the diffusing hole includes an outer opening positioned on the outer wall that includes an oval cross section.

13. The heat shield panel of claim 12, wherein the diffusing hole includes a cross sectional area that increases in size continuously from the inner opening to the outer opening.

* * * * *